United States Patent
Misawa

(10) Patent No.: US 7,046,274 B1
(45) Date of Patent: May 16, 2006

(54) DIGITAL CAMERA AND METHOD OF RECYCLING DIGITAL CAMERA

(75) Inventor: Takeshi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/500,224

(22) Filed: Feb. 8, 2000

(30) Foreign Application Priority Data

Mar. 2, 1999 (JP) .................................. 11-053857

(51) Int. Cl.
*H04N 5/225* (2006.01)
*H04N 9/04* (2006.01)

(52) U.S. Cl. .............................. 348/207.99; 348/211.1; 348/211.2

(58) Field of Classification Search ................ 348/373, 348/787, 789, 799, 843, 836
See application file for complete search history.

(56) References Cited

U.S. PATENT DOCUMENTS

| | | | |
|---|---|---|---|
| 4,523,825 A * | 6/1985 | Norris ........................ 396/580 |
| 5,603,102 A * | 2/1997 | Rebec et al. ................ 455/90.3 |
| 5,804,829 A * | 9/1998 | Palmer .................... 250/504 H |
| 5,870,636 A * | 2/1999 | Sugita et al. ................ 396/106 |
| 5,879,289 A * | 3/1999 | Yarush et al. ............... 600/179 |
| 5,959,671 A * | 9/1999 | Etoh et al. ................... 348/373 |
| 6,181,883 B1* | 1/2001 | Oswal ........................ 396/429 |
| 6,183,274 B1* | 2/2001 | Allum ........................ 439/135 |
| 6,304,724 B1* | 10/2001 | Ando .......................... 396/29 |
| 6,642,959 B1* | 11/2003 | Arai ......................... 348/231.3 |

FOREIGN PATENT DOCUMENTS

| JP | A9149315 | 6/1997 |
|---|---|---|
| JP | 10042231 A * | 2/1998 |

* cited by examiner

*Primary Examiner*—David Ometz
*Assistant Examiner*—Yogesh Aggarwal
(74) *Attorney, Agent, or Firm*—Birch Stewart Kolasch & Birch LLP

(57) ABSTRACT

A method for recycling a digital camera which includes: a communication section which outputs image data to an external device; and a protecting cover which covers the communication section and which is removed at times when the image data is output, wherein after the protecting cover is removed and the image data is taken out from the communication section, the communication section is once again covered by the protecting cover.

20 Claims, 4 Drawing Sheets

DIGITAL CAMERA AND METHOD OF RECYCLING DIGITAL CAMERA

BACKGROUND OF THE INVENTION

1. Field of the Invention

The present invention relates to a digital camera, and in particular, to a digital camera in which a communication section which outputs image data to an external device is provided, and to a method of recycling a digital camera.

2. Description of the Related Art

At present, digital cameras with an infrared communication function which can perform data communication with an external device, such as a computer or the like, by using infrared radiation, have been used.

As disclosed in Japanese Patent Application Laid-Open (JP-A) No. 9-149315, when an image which was photographed is transmitted to a personal computer or the like as digital data, it is not necessary to connect the digital camera and a personal computer with a predetermined cable, and the image data is transmitted and received through a communication section provided at the digital camera, by using infrared radiation.

However, despite the fact that the communication section is not needed during photographing, it is a portion of the body of the digital camera and is therefore exposed at the exterior of the digital camera. Therefore, there are cases in which the user touches the communication section and fingerprints are formed on the communication section, or dust or the like adheres to the communication section. Moreover, there is a problem in that, if the digital camera is hit against an object, while it is being carried, the communication section will be damaged and image data cannot be taken out normally from the communication section.

SUMMARY OF THE INVENTION

Accordingly, in order to solve the above-described problems, an object of the present invention is to provide a digital camera in which, by covering a communication section of the digital camera with a protecting means or cover, the communication section can be protected and the image data can be taken out normally. Moreover, the present invention relates to a method of recycling a digital camera in which, after image data is taken out from a communication section of a digital camera, by covering the communication section once again with the protecting means, the digital camera can be used again.

A first aspect of the present invention is a method of recycling a digital camera comprising: a communication section which outputs image data to an external device; and protecting means which covers the communication section and which is removed at times when the image data is output, wherein, after the protecting means is removed and the image data is taken out from the communication section, the communication section is once again covered by the protecting means.

In accordance with this structure, after the protecting means is removed and the image data is taken out from the communication section, by covering the communication section once again with the protecting means so as to return the digital camera to its original state, the digital camera can be recycled easily. As a result, the costs of the digital camera, such as the manufacturing cost, can be reduced.

A second aspect of the present invention is a digital camera comprising a communication section which outputs image data to an external device, and protecting means or a protecting cover which covers the communication section and is removed at times when the image data is output.

In accordance with this structure, by covering the communication section, which outputs the image data to an external device, with the protecting means or cover, the communication section can be protected. Therefore, the user can be prevented from touching the communication section, and the communication section will not be dirtied or damaged. Moreover, when data communication with an external device is carried out, if the protecting means is removed, accurate image data can be taken out from the communication section.

In the present invention, the protecting means preferably covers the communication section and charging terminals for charging a power source.

In accordance with this structure, by covering, with the protecting means or cover, the communication section and the terminals for charging the power source, the charging terminals are not dirtied or damaged. Therefore, the function of the charging terminals can be maintained.

In the present invention, the protecting means is preferably elastic.

In accordance with this structure, the protecting means is elastic. Therefore, even if the communication section is hit by an object from the exterior, due to the elasticity of the protecting means, the communication section can be reliably protected.

In the present invention, the protecting means is preferably a protective film which wraps up the communication section and the charging terminals.

In accordance with this structure, the protecting means is a protection film which wraps up the communication section and the charging terminals. Therefore, the protection film cannot be removed inadvertently, and the communication section and the charging terminals can be better protected.

The present invention may further comprise indicating means for indicating that the protecting means was removed.

In accordance with this structure, because the indicating means is provided at the digital camera, it can easily be recognized that the protecting means has been removed. Accordingly, in particular, reliability of the data which is stored inside the digital camera, for example, whether or not the data has been read-out or rewritten arbitrarily can be confirmed easily.

In the present invention, the indicating means is preferably a "seal broken" mark which is exposed when the protecting means is removed.

In accordance with this structure, because the "seal broken" mark is exposed when the protecting means is peeled off, it is easy to confirm the reliability of the image data. Moreover, at regular times, the "seal broken" mark is not exposed at the exterior of the digital camera. Therefore, degrees of freedom in designing of the digital camera can be improved.

DESCRIPTION OF THE PREFERRED EMBODIMENTS

Figure 1A:
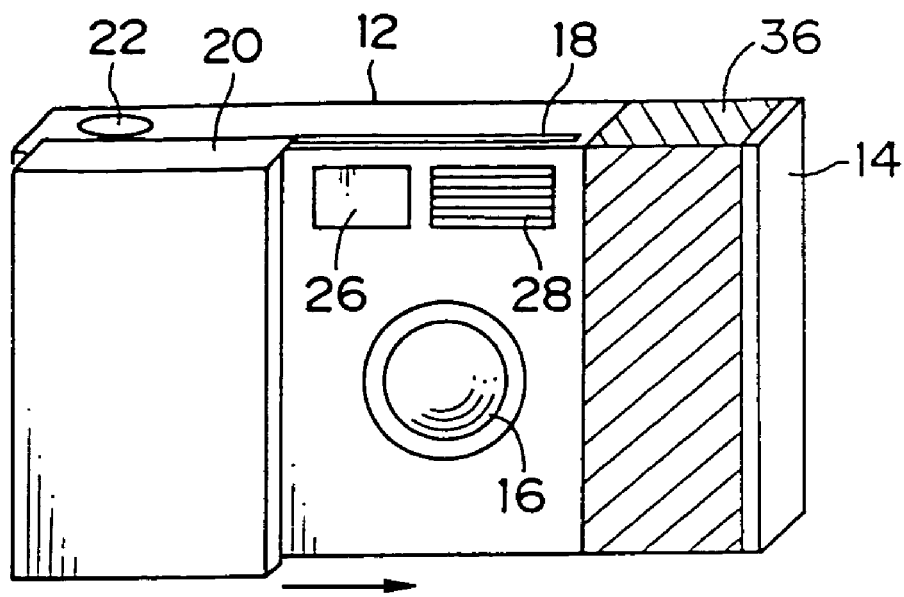
FIG. 1A is an exterior structural view which shows the exterior of a digital camera relating to an embodiment of the present invention.
Figure 1B:
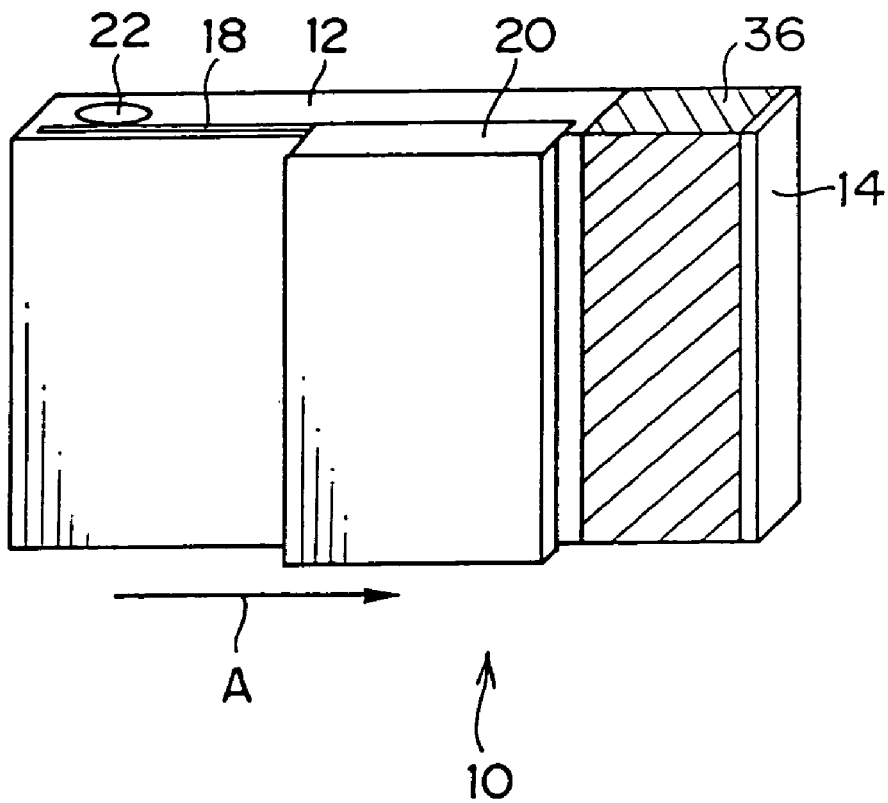
FIG. 1B is an exterior structural view which illustrates a state in which a lens cover, which is provided at the digital camera relating to the embodiment of the present invention, is closed.

A digital camera relating to an embodiment of the present invention will be described hereinafter with reference to the accompanying drawings. FIGS. 1A and 1B are exterior structural views which show the exterior of the digital camera.

As illustrated in FIG. 1A, a digital camera 10 of the present embodiment is formed of a camera body 12 which photographs a subject and stores image data, and an infrared communication device 14 which performs data communication with an external device (not illustrated) such as a computer on the basis of the stored image data.

The contour of the camera body 12 is formed in the shape of a box. A photographing lens 16 is provided at the front surface of the camera body 12 at a position somewhat toward the right (in FIG. 1A) of the center. Moreover, a guide rail 18 is formed in the top surface of the camera body 12. As illustrated in FIG. 1B, a lens cover 20 which protects the photographing lens 16 slides along this guide rail 18 in the direction of A and in the direction opposite thereto. Further, by opening and dosing the lens cover 20, a power switch is turned ON/OFF. Therefore, the lens cover 20 also serves as a power switch.

Further, a shutter button 22 is provided in the top surface of the camera body 12. By pressing the shutter button 22, image data is stored in a memory 24 (see FIG. 4) which will be described later. Moreover, in the upper side of the front face of the camera body 12, an optical finder 26 is provided. Next to the optical finder 26 (in the present embodiment, at the right side of the optical finder 26), a flash 28 which emits supplementary light is provided.

Figure 2:
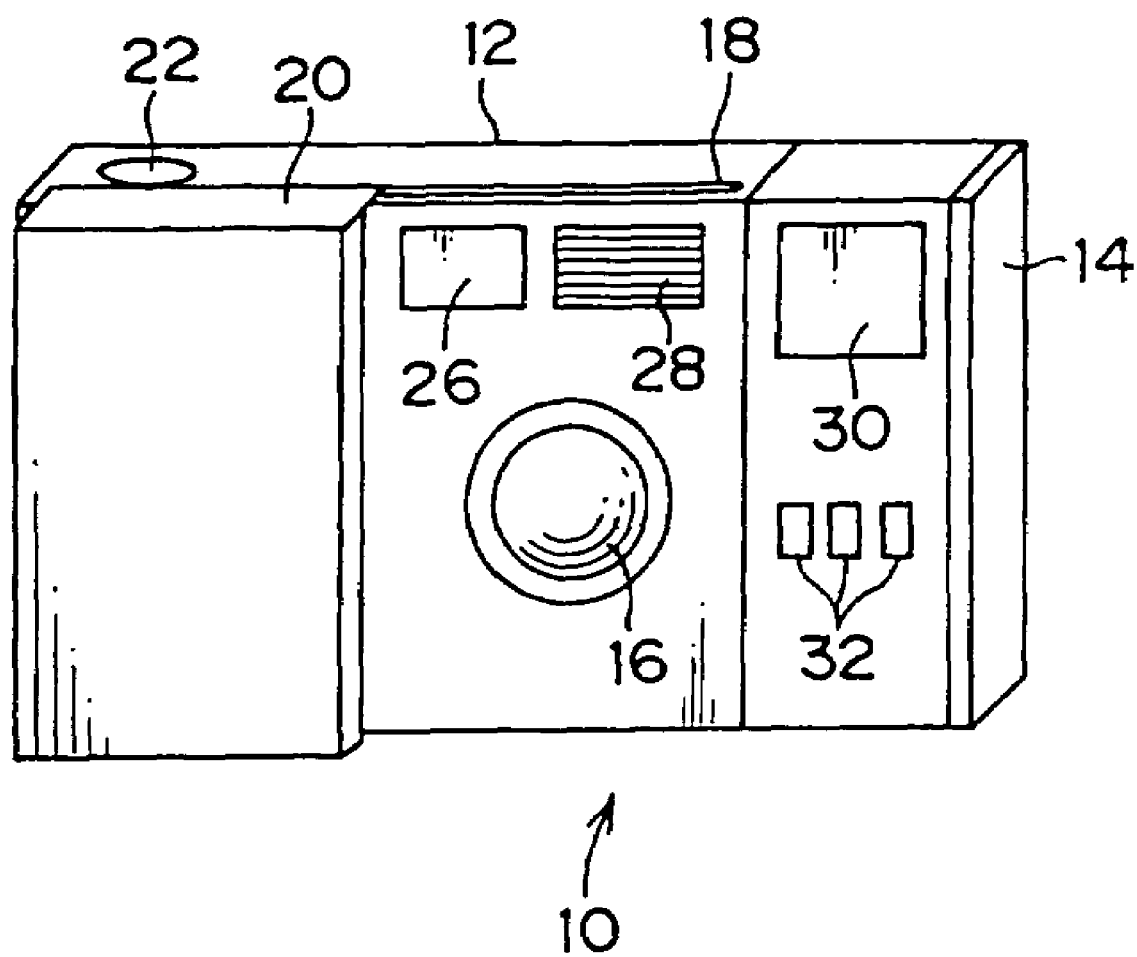
FIG. 2 is an exterior structural view which shows a state in which a protecting member, which is a portion of the digital camera of the present invention, has been removed.

As shown in FIG. 2, the infrared communication device 14 is formed integrally with the camera body 12, and, in the same way as the camera body 12, is formed in the shape of a box. In the front face of the infrared communication device 14, a window 30, which serves as a communication section which sends image data stored in the memory 24 to a computer, is provided. Moreover, charging terminals 32 for charging a power source are provided beneath the window 30.

Figure 3:
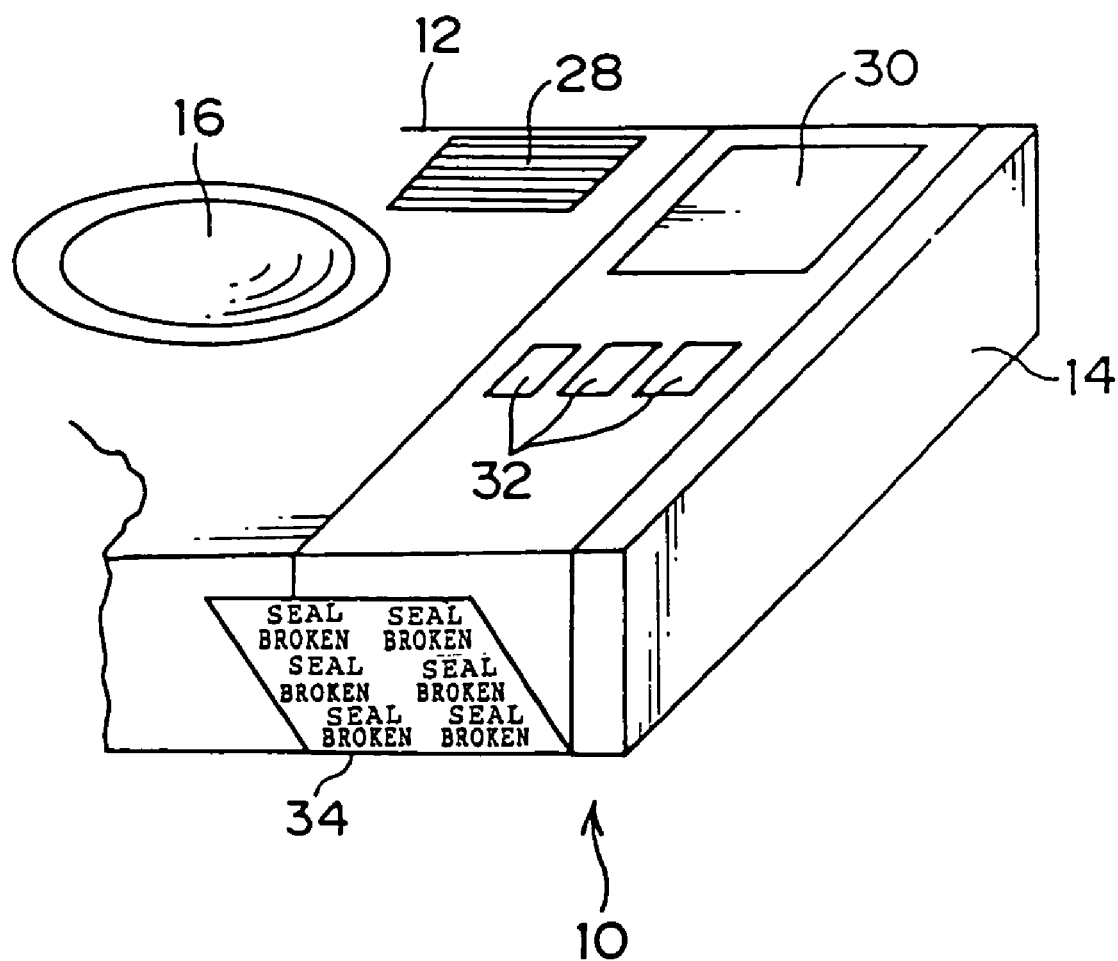
FIG. 3 is a view which shows a state in which an indicating means is provided at the digital camera of the present invention.

As shown in FIG. 3, a "seal broken" mark 34, which is a sticker on which the words "seal broken" have been printed, is firmly adhered to the bottom surface of the infrared communication device 14. Further, although not illustrated, the words "seal broken" may be directly marked on a portion of the infrared communication device 14 of the digital camera 10.

As illustrated in FIGS. 1A, 1B and 2, a protective film 36 (the portion indicated by hatching in FIGS. 1A, 1B and 2), which integrally covers the "seal broken" mark 34, the window 30 and the charging terminals 32, is wrapped around the outer side of the infrared communication device 14. The protection film 36 closely contacts and is firmly attached to the outer side of the infrared communication device 14, so as to wrap up the window 30 and the charging terminals 32. Also, paper may be used in place of the protection film 36. The protection film 36 is formed of polypropylene and is elastic. Thus, the protective film 36 functions as a cushion which effectively protects the window 30, and further, if the protective film 36 become caught on an object, it is difficult for it to be peeled off without the user's knowledge.

As described above, by covering the window 30 with the protection film 36, fingerprints, dust, and the like do not adhere to the window 30, the window 30 can be prevented from being damaged, and the function of the infrared communication device 14 can be maintained. Further, by covering the charging terminals 32 for charging the power source, it is also possible to maintain the function of the charging terminals 32.

Further, by covering the "seal broken" mark 34 (indicating means), once the protection film 36 is removed, the "seal broken" mark 34 printed "seal broken" will be exposed. Therefore, in particular, in a case in which the digital camera 10 is lost, it can be ascertained whether or not internal data was read or written arbitrarily by strangers, and the reliability of the internal data can be confirmed easily.

Moreover, at regular times (at times when the protection film 36 is attached), the "seal broken" mark 34 is not exposed at the surface (body) of the digital camera 10, and is first exposed when the protection film 36 is removed. Therefore, the degrees of freedom in design of the digital camera 10 can be improved.

Further, the "seal broken" mark 34 does not necessarily have to be provided at the bottom surface of the infrared communication device 14. Provided that the "seal broken" mark 34 is covered by the protective film 36, the "seal broken" mark 34 may be provided at the top surface or a side surface of the infrared communication device 14. Further, even if the "seal broken" mark 34 is not covered by the protective film 36, for example, instead of a "seal broken" mark 34, a mark on which the words "protective film attached" or the like are printed may be firmly adhered to the side of the camera main body 12, or the words "protective film attached" may be marked on the body of the digital camera 10. In this way as well, the fact that the protection film 36 was initially fixed to the window 30 of the infrared communication device 14 can be indicated and ascertained easily.

Figure 4:
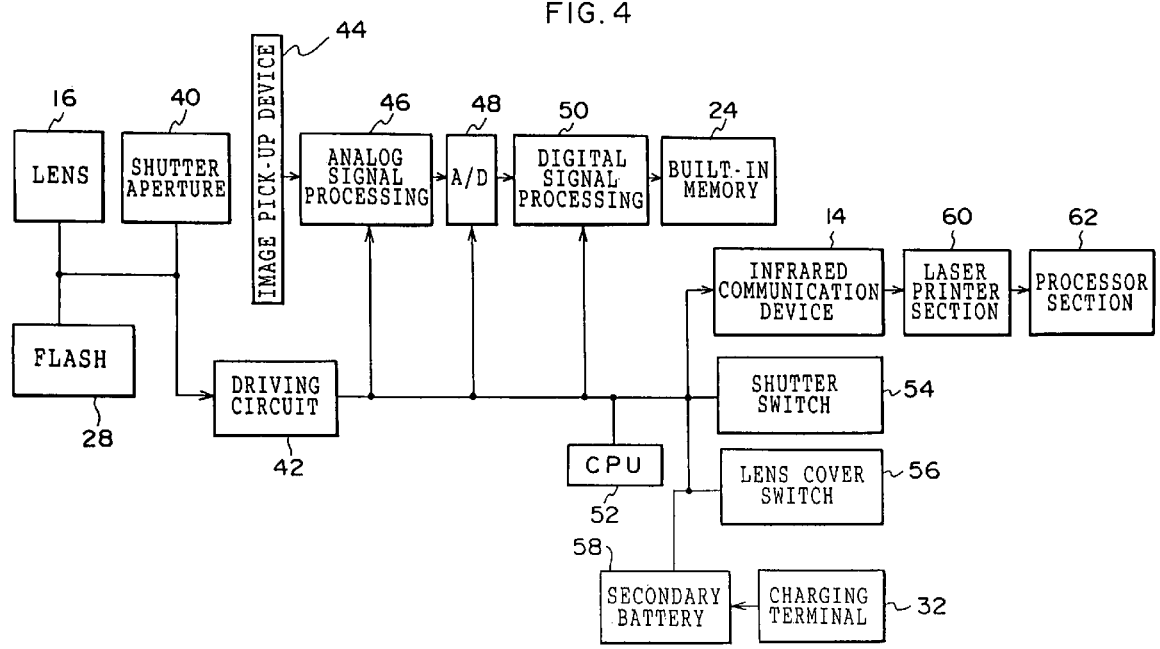
FIG. 4 is a block diagram which shows the structure of the digital camera of the present invention.

Next, on the basis of the block diagram shown in FIG. 4, the internal structure of the digital camera of the present embodiment will be described. As illustrated in FIG. 4, the digital camera 10 comprises the photographing lens 16 which photographs a subject; the flash 28 which irradiate the subject with additional light; a shutter/aperture mechanism 40; a driving circuit 42 which outputs driving signals to an image pick-up device 44; the image pick-up device 44 (CCD) which outputs image signals; an analog signal processing circuit 46 serving as a signal processing section; an A/D converting section 48 which converts analog signals to digital signals; a digital signal processing circuit 50; the memory 24 which stores image signals as image data; a CPU 52 which controls the entire digital camera 10; the infrared communication device 14 which performs data communication; a shutter switch 54; a lens cover switch 56; a secondary battery 58 which is a power source; and the charging terminals 32 for charging the power source.

Further, a laser printer section 60 and an output section including a processor section 62 are provided at the exterior of the infrared communication device 14. The laser printer section 60 records an image onto a photographic printing paper on the basis of the image data transmitted from the infrared communication device 14. The processor section 62 carries out various processings such as color development and the like on the photographic printing paper onto which an image has been recorded by the laser printer section 60.

Next, operation of the digital camera of the present embodiment will be described.

When the lens cover 20 is opened, the required power is supplied from the secondary battery 58 to respective sections of the digital camera 10 represented by blocks in the block diagram of FIG. 4. Then, at times when the degree of illumination is low, the flash 38 is used to provide supplementary light. When a shutter switch 54 is pressed, the reflected light which is reflected from the subject is incident on the photographing lens 16 and the shutter/aperture mechanism 40, and is focalized on the image pick-up device 44. Here, the shutter of the shutter/aperture mechanism 40 is a mechanical shutter and prevents light from hitting and smears from being generated when a signal is read from the pick-up device 44. Moreover, the aperture of the shutter/aperture mechanism 40 is formed by the electronic shutter of the image pick-up device 44 and a mechanical shutter, and controls the amount of exposure to light on the image pick-up device 44.

Then, the image pick-up device 44 is driven by a photographing device driver (not illustrated) at a timing generated by a timing generating circuit (not illustrated), and outputs an image signal which is image data. Further, depending on the driving voltage conditions of the image pick-up device 44, the photographing device driver may be unnecessary.

After the image signal is subjected to signal processing at the analog signal processing section 46, at the A/D converting section 48, the image signal is converted to a digital signal. At a digital signal processing section 50, the signal is again subjected to signal processing and is stored in the memory 24. Further, when the image data is compressed and stored, compression is carried out at the digital signal processing section 50 or at the CPU 52.

Next, when the image data stored in the memory 24 is to be taken out, the protection film 36 adhered to the infrared communication device 14 and covering the window 30 is removed. Thereafter, due to a driving instruction from the CPU 52, the image data stored in the memory 24 is illuminated as infrared light from the window 30 toward an external device, such as a computer or the like (not shown). In addition to the transmission of image data to an external device such as a computer being carried out through the window 30 controlled by the CPU 52, the reading of maintenance data, the reading of settings and the like are also carried out through the window 30.

Thereafter, if the communication of data to an external computer is completed, the image data stored in the memory 24 is deleted. Then, in the same way as the initial digital camera 10 illustrated in FIGS. 1A and 1B and 2, once again, the protection film 36 is affixed to the infrared communication device 14 so as to cover the window 30, and recycling of the digital camera 10 is performed.

As described above, by affixing the protection film 36 and reusing (recycling) the digital camera 10 which was used once, a reduction in manufacturing costs and the like can be realized.

Further, as an alternative example of the digital camera 10 of the above-described embodiment, charging may be performed by non-contact-type electromagnetic induction, instead of by contact charging by use of the charging terminals 32.

In this alternative example, there is no need to form the charging terminals 32 on the body of the digital camera, and thus no need to cover charging terminals with the protection film 36.

According to the present invention, by covering the communication section with a protecting means, the communication section can be protected easily. Therefore, the communication section can be prevented from being touched by the user, and is not dirtied nor damaged. As a result, when data communication with an external device is performed, accurate image data can be taken out from the communication section.

Further, after removing the protecting means to take out the image data from the communication section, by covering the communication section once again with the protecting means so as to set the digital camera in its original state by recycling method of the present invention, the digital camera can be recycled easily. As a result, a reduction in cost can be realized.

The invention claimed is:

1. A method of recycling a digital camera which includes an infrared communication section, comprising:
   outputting image data from the infrared communication section to an external device; and
   covering the infrared communication section portion of the digital camera with a removable protecting means which is removed at times when the image data is output, the protecting means substantially contouring to the outer surface of the infrared communication section,
   wherein, after the protecting means is removed and the image data is taken out from the infrared communication section, the infrared communication section is once again covered by the protecting means, thereby returning the digital camera to it's original state.

2. A method of recycling a digital camera according to claim 1, wherein the protecting means covers the infrared communication section and charging terminals for charging a power source.

3. Method of recycling a digital camera according to claim 1, wherein said protecting means is a sheet-shaped member which is elastic.

4. A method of recycling a digital camera according to claim 1, wherein said protecting means is a protection film which wraps up the infrared communication section and the charging terminals.

5. A method of recycling a digital camera according to claim 1, further comprising an indicating means for indicating that said protecting means was removed.

6. Digital camera according to claim 5, wherein said indicating means is a "seal broken" mark which is exposed when the protecting means is removed.

7. A digital camera comprising:
   an infrared communication section which outputs image data to an external device, and
   a removable protecting means which covers the infrared communication section of the digital camera and is removed at times when the image data is output, and when the infrared communication section is one again covered by the protecting means the digital camera is reset to it's original state, the protecting means substantially contouring to the outer surface of the communication section.

8. A digital camera according to claim 7, wherein the protecting means covers the infrared communication section and charging terminals for charging a power source.

9. A digital camera according to claim 7, wherein said protecting means is a sheet-shaped member which is elastic.

10. A digital camera according to claim 7, wherein said protecting means is a protection film which wraps up the infrared communication section and the charging terminals.

11. A digital camera according to claim 7, further comprising indicating means for indicating that said protecting means was removed.

12. A digital camera according to claim 7, wherein said infrared communication section is formed integrally with a body of the digital camera, and is a window whose transmission of data to and receipt of data from an external device is controlled by a CPU.

13. A digital camera according to claim 11, wherein said indicating means is a "seal broken" mark which is exposed when the protecting means is removed.

14. A digital camera comprising:
   an infrared communication section which outputs image data to an external device, and
   a removable protecting cover which covers the communication section and is removed at times when the image data is output, thereby resetting the communication section, the protecting cover substantially contouring to the outer surface of the communication section.

15. A digital camera according to claim 14, wherein the protecting cover covers the infrared communication section and charging terminals for charging a power source.

16. A digital camera according to claim 14, wherein said protecting cover is a sheet-shaped member which is elastic.

17. A digital camera according to claim 14, wherein said protecting cover is a protection film which wraps up the infrared communication section and the charging terminals.

18. A digital camera according to claim 14, further comprising indicating means for indicating that said protecting means was removed.

19. A digital camera according to claim 14, wherein said infrared communication section is formed integrally with a body of the digital camera, and is a window whose transmission of data to and receipt of data from an external device is controlled by a CPU.

20. A digital camera according to claim 18, wherein said indicating means is a "seal broken" mark which is exposed when the protecting means is removed.

* * * * *